United States Patent [19]
Asanuma et al.

[11] Patent Number: 5,927,071
[45] Date of Patent: Jul. 27, 1999

[54] HYDRAULIC PRESSURE SOURCE APPARATUS AND VEHICLE HEIGHT CONTROL APPARATUS

[75] Inventors: Nobuyoshi Asanuma; Yukio Hayakawa; Satoshi Kondo, all of Saitama-ken, Japan

[73] Assignee: Honda Giken Kogyo Kabushiki Kaisha, Tokyo, Japan

[21] Appl. No.: 08/753,501

[22] Filed: Nov. 26, 1996

[30] Foreign Application Priority Data

| Nov. 28, 1995 | [JP] | Japan | 7-308661 |
| Aug. 27, 1996 | [JP] | Japan | 8-224830 |
| Aug. 27, 1996 | [JP] | Japan | 8-224831 |

[51] Int. Cl.$^6$ .............. F16D 31/02; F03C 5/00; F02N 9/00
[52] U.S. Cl. .............. 60/396; 60/531; 60/631; 165/47; 165/154
[58] Field of Search .............. 60/396, 531, 618; 165/141, 154, 47

[56] References Cited

U.S. PATENT DOCUMENTS

| 3,945,210 | 3/1976 | Chapin | 60/618 |
| 5,107,922 | 4/1992 | So | 165/154 |

FOREIGN PATENT DOCUMENTS

| 3232497 | 2/1983 | Germany | 60/531 |

*Primary Examiner*—F. Daniel Lopez
*Attorney, Agent, or Firm*—Armstrong, Westerman, Hattori, McLeland & Naughton

[57] ABSTRACT

The hydraulic pressure to be supplied to a hydraulic actuator mounted on a vehicle, such as a hydraulic cylinder for vehicle height control, is arranged to be generated by utilizing a waste heat of a power source such as an engine of the vehicle or the like. There are provided an oil chamber to be connected to a hydraulic actuator, a pressurizing chamber containing therein, in a sealed manner, a medium which varies between a gaseous state and a liquid state, and a heating device which heats and evaporates the medium inside the pressurizing chamber and through which cooling water for cooling the power source to be mounted on the vehicle flows. The hydraulic pressure is generated by compressing the oil chamber by a vapor pressure of the medium inside the pressurizing chamber. In case the hydraulic actuator is a hydraulic cylinder for a vehicle height control, there is provided a flow control valve which controls the amount of supply of the cooling water to the heating device depending on the vehicle height.

7 Claims, 5 Drawing Sheets

HYDRAULIC PRESSURE SOURCE APPARATUS AND VEHICLE HEIGHT CONTROL APPARATUS

BACKGROUND OF THE INVENTION

1. Field of the Invention

The present invention relates to a hydraulic pressure source apparatus for generating a hydraulic pressure to be supplied to a hydraulic actuator mounted on a vehicle such as a motor vehicle. It also relates to a vehicle height control apparatus which utilizes this hydraulic pressure source apparatus.

2. Description of the Related Art

It Is conventionally known to mount on a motor vehicle a hydraulic actuator such as a hydraulic cylinder for vehicle height control and a hydraulic cylinder for rear-wheel steering in a four-wheel steering vehicle. In such an arrangement, as a hydraulic pressure source for the hydraulic actuator, there is provided a hydraulic pump to be driven by an electric motor or an engine.

In the above-described conventional example, the use of the hydraulic pump causes an increase in the energy consumption, resulting In a problem in improving the specific fuel consumption.

In view of the above problem, the present invention has an object of providing a hydraulic pressure source apparatus which is arranged to enable to generate a hydraulic pressure by utilizing a waste heat of a power source to be mounted on a motor vehicle. It has also an object of providing a vehicle height control apparatus which utilizes this hydraulic pressure source apparatus.

SUMMARY OF THE INVENTION

In order to attain the above-described objects, according to a first aspect of the present invention, there is provided a hydraulic pressure source apparatus for generating a hydraulic pressure to be supplied to a hydraulic actuator mounted on a vehicle. The hydraulic pressure source apparatus comprises: an oil chamber connected to the hydraulic actuator; a pressurizing chamber containing therein, in a sealed manner, a medium which varies between a gaseous state and a liquid state; and a heating device which heats and evaporates the medium inside the pressurizing chamber and through which a coolant for cooling a power source to be mounted on the vehicle flows; wherein the hydraulic pressure is generated by compressing the oil chamber by a vapor pressure of the medium inside the pressurizing chamber.

According to this arrangement, the hydraulic pressure can be generated via the medium inside the pressurizing chamber by that waste heat of the power source which is transmitted to the heating device via the coolant. Therefore, there will be no energy consumption for the purpose of generating this hydraulic pressure. The specific fuel consumption can thus be improved as compared with the one in which a hydraulic pump to be driven by an electric motor or an engine is used.

According to a second aspect of the present invention, the apparatus according to the above-described first aspect of the present invention is used as a hydraulic pressure source apparatus for a hydraulic cylinder for controlling the height of a vehicle, and there is further provided means for controlling an amount of supply of the coolant to the heating device depending on the vehicle height. According to this arrangement, that vapor pressure of the medium inside the pressurizing chamber which is heated and evaporated by the heating device, namely the hydraulic pressure to be supplied to the hydraulic cylinder, is automatically controlled to be increased or decreased depending on the vehicle height. The height of the vehicle is thus maintained in a certain level.

In the hydraulic pressure source apparatus of the above-described first aspect of the present invention, it is considered to provide an outer shell and an inner shell which constitute the heating device, and to constitute a space between the outer shell and the inner shell as a heating chamber through which the coolant flows, and to further constitute the inside of the inner shell as the pressurizing chamber. In this arrangement, it is required to enable to efficiently perform a heat transfer from the coolant inside the heating device to the medium inside the pressurizing chamber. It is also required to reinforce the inner shell to enable to secure the strength as a pressure vessel.

In such a case, if there is provided a fin member of corrugated plate shape which is disposed inside the heating chamber so as to contact the outer shell and the inner shell, the area of heat transfer is increased by the fin member. As a result, the heat of the coolant to flow through the heating chamber becomes efficiently transmitted to the medium inside the pressurizing chamber. In addition, the internal pressure inside the pressurizing chamber can be received not only by the inner shell but also by the outer shell via the fin member. Both the heat transfer efficiency and the strength can thus be improved.

If a plurality of window openings are provided in the fin member in order to introduce the coolant flowing in a passage portion defined by the outer shell and the fin member into a passage portion defined by the inner shell and the fin member, a direct heat transfer between the coolant and the inner shell can be accelerated. The heat transfer efficiency can thus be further improved.

If the outer shell is formed by a resin, good thermal insulating characteristics of the outer shell are obtained to thereby restrain the heat radiation from the outer shell. It is thus advantageous in attempting an improvement in the heat transfer efficiency.

The medium in liquid state stays at the bottom of the pressurizing chamber. Therefore, if no particular arrangement is made, the heat transfer portion which contributes to the heating and evaporation of the medium will be limited to the bottom wall of the inner shell and its neighborhood. As a solution, if there is disposed a raised bottom plate in a bottom portion of the pressurizing chamber with a clearance to a bottom wall of the inner shell, and if a gap around the raised bottom plate to a side wall of the inner shell is secured, liquid droplets of the medium, as a result of boiling of the medium, will be scattered from the clearance between the raised bottom plate and the bottom wall of the inner shell upwards through the gap around the raised bottom plate. The medium in liquid state will thus be distributed also to the upper portion of the pressurizing chamber. Therefore, not only the bottom wall of the inner shell but also the raised bottom plate and the cylindrical side wall become the heat transfer portions which contribute to the heating and evaporation of the medium. As a result of the increase in the area of heat transfer, the medium can effectively be heated and evaporated.

If a plurality of projections elongated in a vertical direction are provided on an inner surface of the side wall of the inner shell at a distance to each other in a circumferential direction, the area of heat transfer advantageously becomes still larger.

The following arrangement can also be considered. Namely, an upwardly extending cylinder is connected to the inner shell, and an oil chamber which is partitioned from the pressurizing chamber is formed inside the cylinder by a piston which is inserted into the cylinder. This construction, however, will results in a larger size of apparatus. On the other hand, if a bellows which can be expanded and contracted in the vertical direction is contained in the inner shell to thereby constitute the oil chamber by the bellows, the apparatus can be minimized in size. However, in case the bellows is employed, at the time of evacuation prior to the charging of the medium into the pressurizing chamber, the evacuating passage which opens to the pressurizing chamber will be blocked (or clogged) through the expansion of the bellows. The evacuation of the pressurizing chamber will therefore no longer be sufficiently made. In such a case, if the raised bottom plate is provided as described above, further downward expansion of the bellows is restricted by the abutment of the bellows with the raised bottom plate. Therefore, if there is provided an evacuating passage communicated with the clearance between the raised bottom plate and the bottom wall of the inner shell, the pressurizing chamber can sufficiently be evacuated without being hindered by the bellows. Further, if the elongated projections are provided on the inner surface of the side wall of the inner shell as described above, there can still be left clearances on both sides of each of the elongated projections even if the bellows comes in touch with the side wall of the inner shell as a result of the expansion of the bellows in the diametrical direction. Poor evacuation by partial clogging of the pressurizing chamber can thus be prevented.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
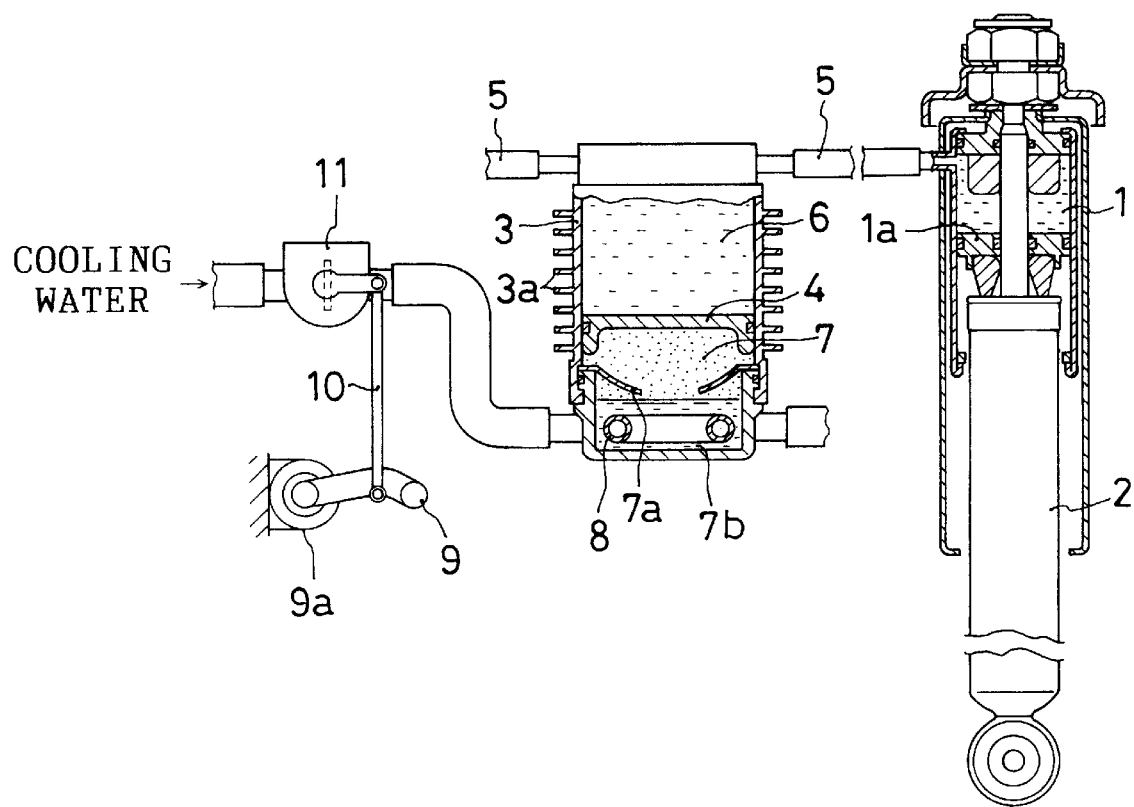
FIG. 1 is a system diagram showing an embodiment of the vehicle height control apparatus which has a first embodiment of the hydraulic pressure source apparatus relating to the present invention.

With reference to FIG. 1, numeral 1 denotes a hydraulic cylinder for controlling (or adjusting) a height of a vehicle such as a motor vehicle. This hydraulic cylinder 1 is provided with a movable piston 1a which abuts with an upper end of a damper 2 to be connected to a suspension arm (not illustrated). Depending on the hydraulic pressure inside the hydraulic cylinder 1, the damper 2 is displaced or moved up and down to thereby function to control the vehicle height.

In the Figure, numeral 3 denotes a cylindrical container or vessel which is provided in an appropriate place on a vehicle body. The internal space of the vessel 3 is defined into upper and lower two chambers by means of a piston 4 which is inserted into the vessel 3. The upper chamber is constituted (or arranged) to be an oil chamber 6 which is connected to the hydraulic cylinder 1 via a hose 5. The lower chamber is arranged to be a pressurizing chamber 7 which contains therein, in a sealed manner, a medium of low boiling point such as ammonia, substitute Freon (e.g., Freon 134a), or the like. On a peripheral wall portion of the vessel 3, there are formed heat radiating fins 3a.

At the bottom portion of the pressurizing chamber 7, there is provided a liquid sump portion 7b into which the medium condensed in the pressurizing chamber 7 flows down through an opening formed in a buffer plate 7a. A heating device 8 which is made up of a heat-exchanging pipe is contained in the liquid sump portion 7b. The heating device 8 is arranged to cause to flow therethrough a coolant such as water, oil or the like which is used to cool a power source to be mounted on the vehicle, e.g., an engine, or an electric motor in case of an electric vehicle (the coolant is hereinafter called cooling water). In a passage on an upstream side of the heating device 8, there is interposed a flow control valve 11 such as a butterfly valve or the like which is operated in interlocking with a stabilizer 9 via a connection rod 10. When the vehicle height lowers due to an increase in the load carried on the vehicle, the stabilizer 9 swings downwards with a bearing portion 9a to the vehicle body working as a supporting point. As a result of this downward swinging movement of the stabilizer 9, the flow control valve 11 is operated in the direction of opening it, whereby the flow amount of the cooling water to be supplied to the heating device 8 is increased.

According to the above-described arrangement, when the vehicle height lowers, the cooling water is supplied to the heating device 8 and, as a result, the liquid-state medium in the liquid sump portion 7b is heated and evaporated by the heat of the cooling water, whereby the vapor pressure of the medium inside the pressurizing chamber 7 rises. The piston 4 is therefore pushed up and the oil chamber 6 is compressed. The oil is sent under pressure to the hydraulic cylinder 1, and the internal pressure in the hydraulic cylinder 1 rises. The damper 2 is thus pushed down and the vehicle height increases. Thereafter, since the amount of heat radiation from the pressurizing chamber 7 through the peripheral (or side) wall portion of the vessel 3 increases as a result of the upward movement of the piston 4, and since the amount of cooling water supply to the heating device 8, i.e., the amount of heat input to the pressurizing chamber 7 is varied by the flow control valve 11 depending on the vehicle height, the vehicle height is maintained constant by a balance between the amount of heat output and the amount of heat input.

Figure 2:
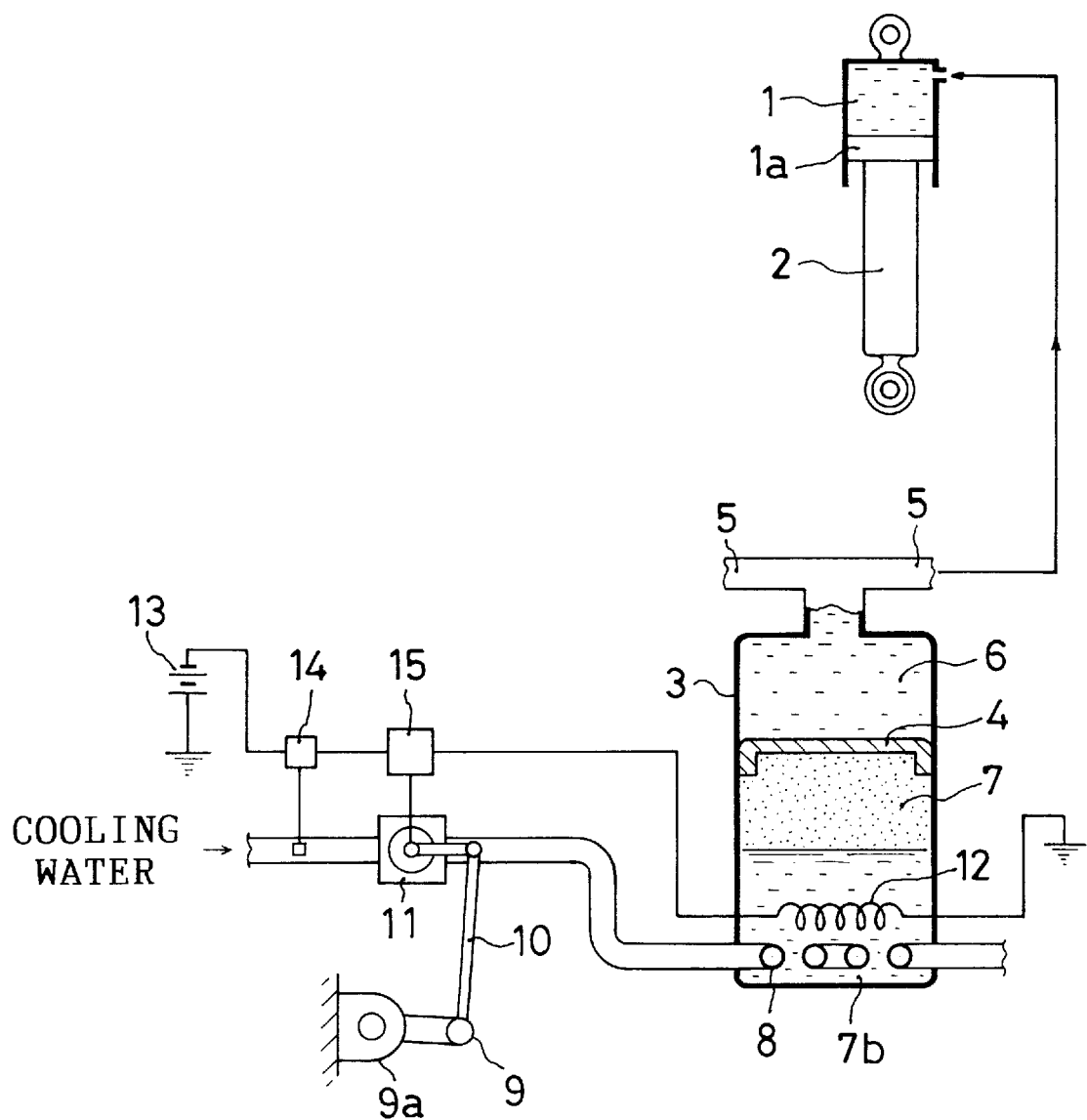
FIG. 2 is a schematic diagram showing another embodiment of the vehicle height control apparatus which has a second embodiment of the hydraulic pressure source apparatus.

In a condition in which the cooling water temperature has not risen sufficiently, such as at the time of a cold start, the medium inside the pressurizing chamber 7 cannot be evaporated. As a solution, in a second embodiment shown in FIG. 2, there is provided an electric heater 12 in addition to the heating device 8. Between the heater 12 and a battery 13 there are interposed a thermostat 14 which is switched on when the cooling water temperature is below a predetermined value, and a variable resistor 15 which is connected to a shaft of the flow control valve 11 and which responds to the vehicle height. When the cooling water temperature is low, the electric heater 12 is charged with electricity via the thermostat 14 and the variable resistor 15 to assist the heating of the medium.

Figure 3:
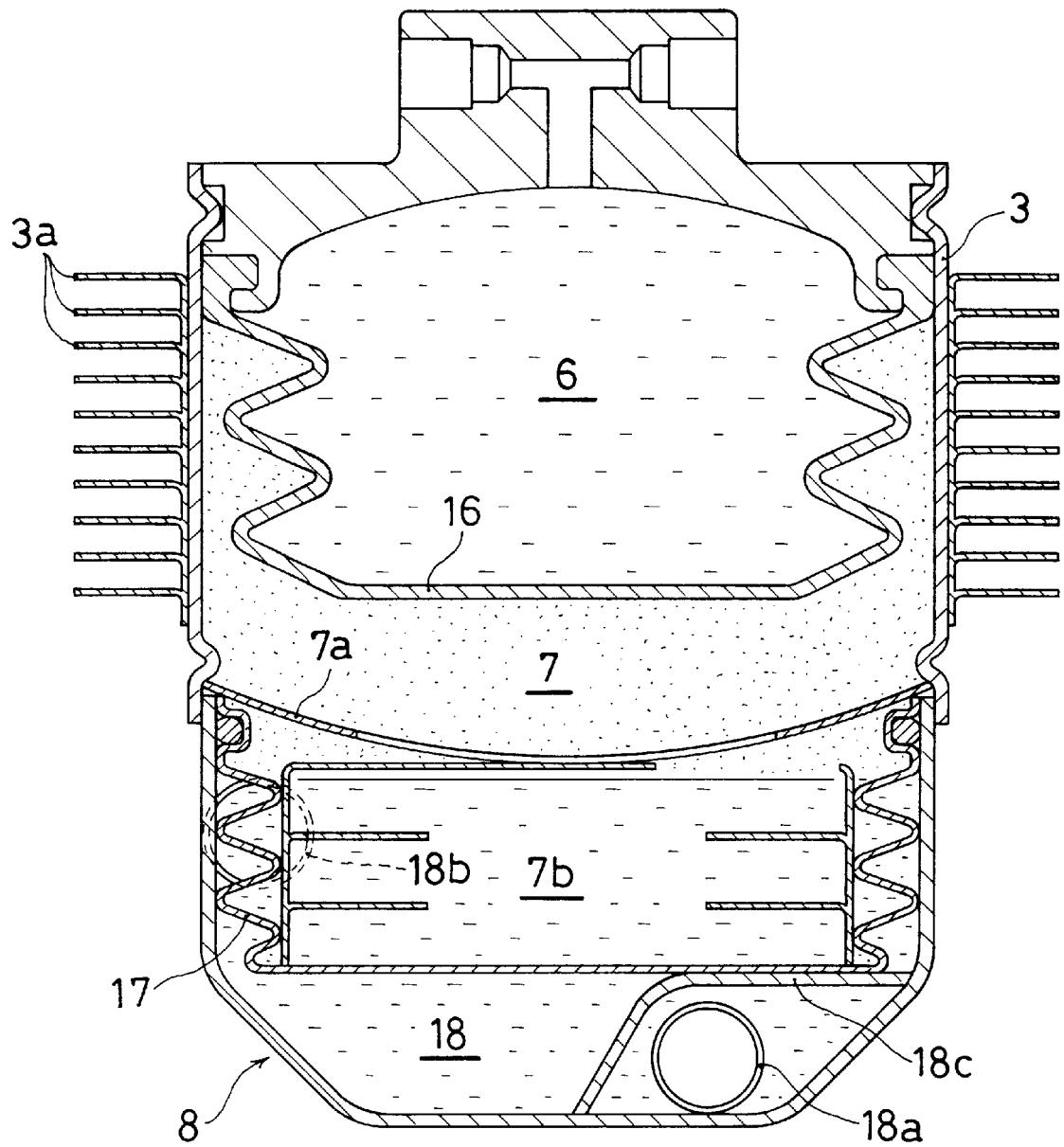
FIG. 3 is a sectional view showing a third embodiment of the hydraulic pressure source apparatus relating to the present invention.

FIG. 3 shows a third embodiment of the present invention. In this embodiment, the oil chamber 6 is defined inside the vessel 3 by means of a rubber bellows 16. It is thus so arranged that the hydraulic pressure is generated by compressing or squeezing the bellows 16 by the vapor pressure of the medium inside the pressurizing chamber 7. There is provided a heating chamber 18 which is partitioned or divided relative to the liquid sump portion 7b of the pressurizing chamber 7 by an inner case 17 having a bellow-like fin portion and which has an inlet 18a and an outlet 18b for the cooling water. This heating chamber 18 constitutes or serves as the heating device 8. In the Figure, numeral 18c denotes that supporting bracket provided inside the heating chamber 18 which supports the inner case 17.

Figure 4:
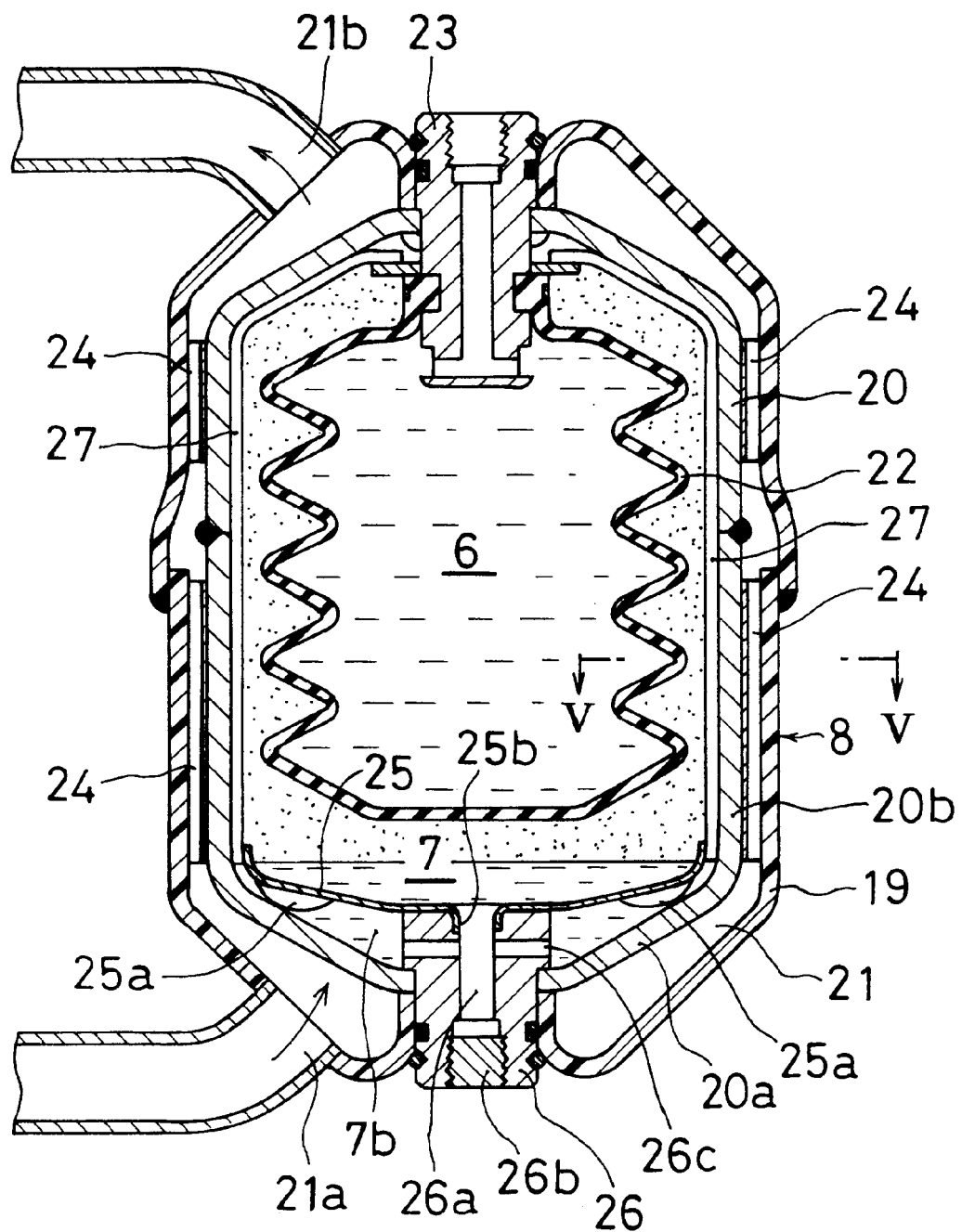
FIG. 4 is a sectional view showing a fourth embodiment of the hydraulic pressure source apparatus relating to the present invention.

FIG. 4 shows a fourth embodiment of the present invention. In this embodiment, there are provided an outer shell 19 and an inner shell 20 which are elongated in the vertical direction and constitute the heating device 8. The space between both the shells 19, 20 is constituted as a heating chamber 21 through which the cooling water flows from a lower end inlet 21a towards an upper end outlet 21b. The inside of the inner shell 20 is constituted as the pressurizing chamber 7. Inside the inner shell 20 there is contained a rubber bellows 22 in a condition in which the upper end thereof is fitted to a piping plug 23 which is provided by insertion into an upper wall portion of the inner shell 20. Further, the inside of the bellows 22 is constituted as the oil chamber 6 which is connected to the hydraulic cylinder 1 for controlling the vehicle height as shown in FIG. 1. It is thus so arranged that the oil chamber 6 is compressed by the vapor pressure of that medium inside the pressurizing chamber 7 which is heated and evaporated by the heat of the cooling water to flow through the heating chamber 21, whereby the hydraulic pressure is generated.

Figure 5:
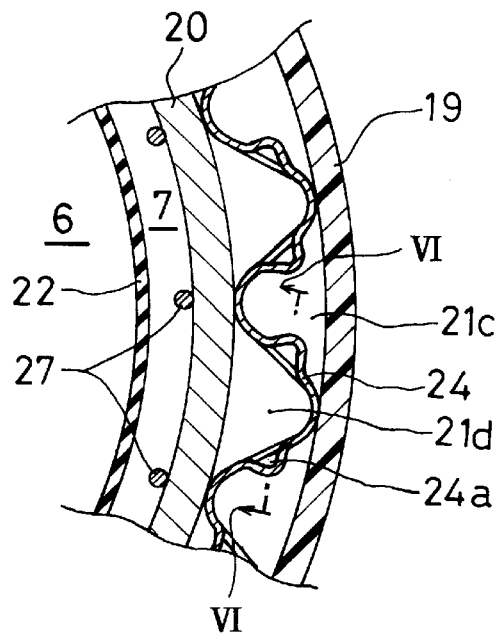
FIG. 5 is an enlarged cross sectional view taken along the line V—V in FIG. 4.

The outer shell 19 is made of a resin with a high thermal insulating capability in order to restrict the heat radiation from the outer shell 19. The inner shell 20 is made of a metal with a good thermal conductivity, such as aluminum. If the wall thickness of the inner shell 20 is made thicker in order to secure a strength as a pressure vessel, the heat mass becomes large. As a result, a longer time is required from the time to start the cooling water flow to the time of hydraulic pressure rise, with a consequent poor response in the heat-pressure conversion. As a solution, in the present embodiment, there is provided inside the heating chamber 21 a corrugated fin member 24 which comes into contact with the outer shell 19 and the inner shell 20, as shown in FIG. 5. It is thus so arranged that the internal pressure in the pressurizing chamber 7 can be received not only by the inner shell 20 but also by the outer shell 21 via the fin member 24. According to this arrangement, the strength as the pressure vessel can be secured without largely increasing the wall thickness of the inner shell 20. By thus minimizing the heat mass, the response in the heat-pressure conversion can be improved.

Figure 6:
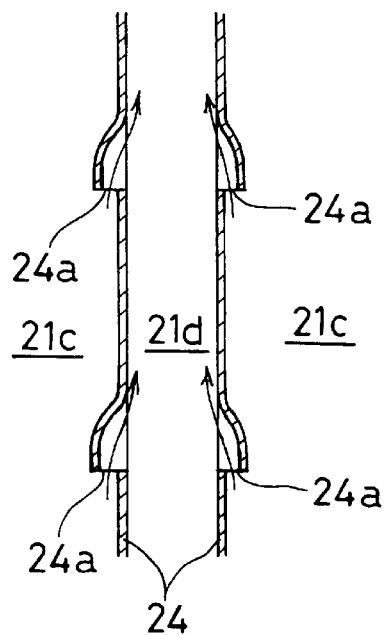
FIG. 6 is a cross sectional view taken along the line VI—VI in FIG. 5.

Further, by providing the fin member 24, the area of heat transfer increases and, consequently, the efficiency of heat transfer from the cooling water to the inner shell 20 is improved. Still furthermore, in the present embodiment, there are formed in the fin member 24 a plurality of window openings 24a by partial cutting and expanding (or erecting) the fin member 24, as shown in FIG. 6. It is thus so arranged that the cooling water flowing through a passage portion 21c which is defined by the outer shell 19 and the fin member 24 can be introduced into a passage portion 21d which is defined by the inner shell 20 and the fin member 24 through these window openings 24a. As a consequence, a direct heat exchanging is accelerated between the cooling water and the inner shell 20, and the heat transfer efficiency can further be improved.

At the bottom of the pressurizing chamber 7, there is provided a raised bottom plate 25 while leaving a clearance between the raised bottom plate 25 and a bottom wall 20a of the inner shell 20. The outer diameter of the raised bottom plate 25 is made slightly smaller than the inner diameter of the inner shell 20, so that there is formed, around or in a circumference of the raised bottom plate 25, a gap between the raised bottom plate 25 and an inner surface of the side (or peripheral cylindrical) wall 20b of the inner shell 20. The raised bottom plate 25 is seated on the bottom wall 20a of the inner shell 20 at dented portions 25a which are formed in a plurality of circumferential points of the raised bottom plate 25. The raised bottom plate 25 is connected at its central portion to a plug 26 which is provided by insertion into the bottom wall 20a.

In the plug 26 there is formed a passage 26a. After having evacuated the pressurizing chamber 7 via the passage 26a, the pressurizing chamber 7 is filled with the medium. Finally, the passage 26a is closed by a blind plug 26b to thereby contain the medium in a sealed manner in the pressurizing chamber 7. The passage 26a is in communication with a central opening 25b of the raised bottom plate 25 and is also in communication with the clearance between the raised bottom plate 25 and the bottom wall 20a of the inner shell 20 via a horizontal opening 26c which is formed in the plug 26. In this manner, even if the bellows 22 is expanded downwards at the time of evacuation to thereby block the opening 25b, suction force is still applied to the pressurizing chamber 7 via the clearance between the raised bottom plate 25 and the bottom wall 20a as well as via the gap in the circumference of the raised bottom plate 25. Therefore, the pressurizing chamber 7 can be sufficiently evacuated without being hindered by the bellows 22.

On the inner surface of the side wall 20b of the a inner shell 20, there are provided a plurality of projections 27 elongated in the vertical direction at a distance from each other as seen in the circumferential direction. Although these projections 27 are constituted or made by a wiring (or rod) material in the present embodiment, these projections 27 may also be formed integrally with the side wall 20b. In evacuating the pressurizing chamber 7, if the bellows 22 is expanded in the diametrical direction to thereby contact the entire inner circumference of the side wall 20b, the portion above the contact portion will no longer be subjected to suction. On the other hand, if the projections 27 are provided, there will be left clearances on both sides of each of the projections 27. The suction force will therefore be applied to the portion above the contact portion via these clearances, and the pressurizing chamber 7 can thus surely be evacuated. The lower ends of the projections 27 are inserted into the clearance between the raised bottom plate 25 and the side wall 20b of the inner shell 20.

When the cooling water flows through the heating chamber 21, the medium in the liquid state staying in the bottom of the pressurizing chamber 7 is heated and evaporated by the heat of the cooling water. At this time, as a result of boiling of the medium, liquid droplets of the medium will be scattered upwards through the gap around the raised bottom plate 25, whereby the medium in liquid state is scattered also into the upper part of the pressurizing chamber 7. Therefore, not only the bottom wall 20a of the inner shell 20, but also the raised bottom plate 25 and the side wall 20b become the heat transferring portions which contribute to the heating and evaporation of the medium in liquid state. In conjunction with the increase in the area of heat transfer by the fin member 24 and the projections 27, the medium in liquid state can be efficiently heated and evaporated. The response in the heat-pressure conversion is thus improved to the maximum extent possible.

An explanation has so far been made about an embodiment in which the hydraulic pressure source to supply the hydraulic pressure to the hydraulic cylinder 1 for vehicle height control is constituted by that apparatus utilizing the waste heat of the engine which is provided with the heating device 8 through which the cooling water of the engine flows, the pressurizing chamber 7, and the oil chamber 6. It is also possible to use an apparatus similar to the above-described one as a hydraulic pressure source for another hydraulic actuator mounted on the vehicle such as a hydraulic actuator for rear-wheel steering.

In addition, in the above-described embodiment, the flow control valve 11 is arranged to be mechanically operated depending on the vehicle height. However, it may also be so arranged that a sensor for detecting the vehicle height is provided to thereby electrically operate the flow control valve by a signal from the sensor.

It is readily apparent that the above-described hydraulic pressure source apparatus and vehicle height control apparatus meet all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A vehicle hydraulic actuator system comprising a hydraulic pressure source apparatus for generating a hydraulic pressure to be supplied to a hydraulic actuator mounted on a vehicle, said apparatus comprising:

an oil chamber connected to said hydraulic actuator;

a pressurizing chamber containing therein, in a sealed manner, a medium which varies between a gaseous state and a liquid state;

a heating device which receives a coolant that cools a power source, and heats and evaporates the medium inside said pressurizing chamber, said power source being mounted on the vehicle, wherein the hydraulic pressure is generated by compressing said oil chamber by a vapor pressure of the medium inside said pressurizing chamber;

an outer shell and an inner shell both constituting said heating device, wherein a space between said outer shell and said inner shell is constituted as a heating chamber through which the coolant flows along an axial direction, and wherein the inside of said inner shell is constituted as said pressurizing chamber;

a fin member of corrugated plate shape disposed inside said heating chamber so as to contact said outer shell and said inner shell, wherein said fin member is provided with a plurality of openings for introducing the coolant flowing in a passage portion defined by said outer shell and said fin member into a passage portion defined by said inner shell and said fin member, and wherein the openings are open toward an upstream side of the flow of the coolant, and shaped to direct the coolant in a direction perpendicular to said axial direction.

2. A vehicle hydraulic actuator system comprising a hydraulic pressure source apparatus for generating a hydraulic pressure to be supplied to a hydraulic actuator mounted on a vehicle, said apparatus comprising:

an oil chamber connected to said hydraulic actuator;

a pressurizing chamber containing therein, in a sealed manner, a medium which varies between a gaseous state and a liquid state;

a heating device which receives a coolant that cools a power source, and heats and evaporates the medium inside said pressurizing chamber, said power source being mounted on the vehicle, wherein the hydraulic pressure is generated by compressing said oil chamber by a vapor pressure of the medium inside said pressurizing chamber;

an outer shell and an inner shell both constituting said heating device, wherein a space between said outer shell and said inner shell is constituted as a heating chamber through which the coolant flows, and wherein the inside of said inner shell is constituted as said pressurizing chamber; and a raised bottom plate disposed in a bottom portion of said pressurizing chamber with a clearance between said raised bottom plate and a bottom portion of said inner shell, wherein there is a gap between said raised bottom plate and a side wall of said inner shell.

3. A vehraulic actuator system pressure source apparatus according to claim 2, further comprising a fin member of corrugated plate shape disposed inside said heating chamber so as to contact said outer shell and said inner shell.

4. A hydraulic pressure source apparatus according to claim 3, wherein said fin member is provided with a plurality of openings for introducing the coolant flowing in a passage portion defined by said outer shell and said fin member into a passage portion defined by said inner shell and said fin member.

5. A hydraulic pressure source apparatus according to claim 3 or 4, wherein said outer shell is formed by a resin.

6. A hydraulic pressure source apparatus according to claim 2, further comprising a plurality of projections elongated in a vertical direction, said projections being provided on an inner surface of said side wall of said inner shell at a distance to each other in a circumferential direction.

7. A hydraulic pressure source apparatus according to claim 2 or 6, further comprising a bellows which constitutes said oil chamber and is contained in said inner shell, and an evacuating passage communicated with the clearance between said raised bottom plate and said bottom wall of said inner shell.

* * * * *